United States Patent Office 3,412,280
Patented Nov. 19, 1968

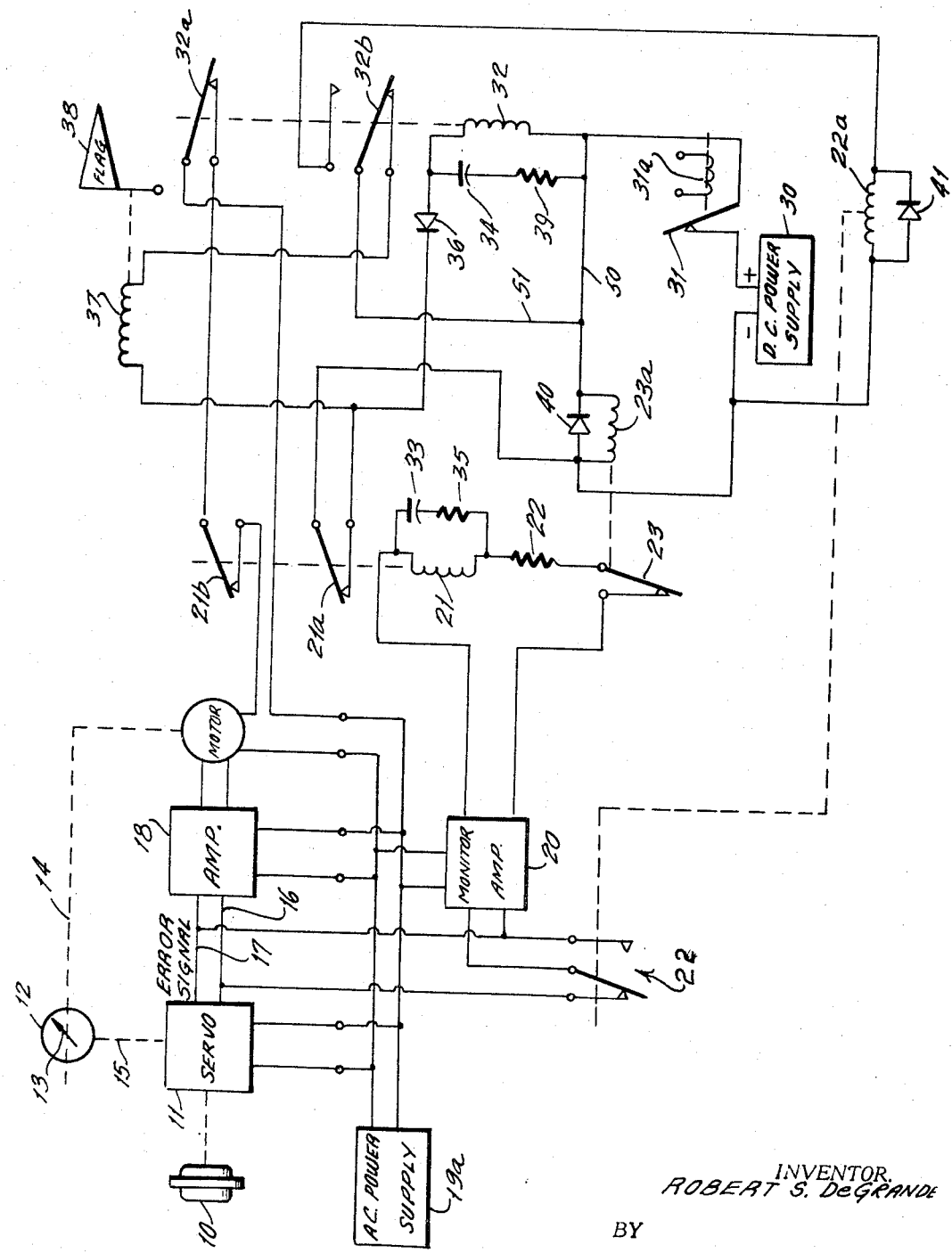

3,412,280
MONITORING DEVICE FOR SERVO SYSTEMS
Robert S. De Grande, Brooklyn, N.Y., assignor to Kollsman Instrument Corporation, Elmhurst, N.Y., a corporation of New York
Filed Oct. 28, 1965, Ser. No. 505,480
5 Claims. (Cl. 318—18)

This invention relates to a monitoring device for servo systems, and more particularly relates to a novel monitoring circuit which monitors an error signal within a servo system and actuates indicator or warning means responsive to a malfunction of the servo system as evidenced by an excessive error signal.

Servo systems are well known to the art wherein an error signal is generated by the movement of a device. This error signal is amplified and actuates a suitable motor which, in turn, moves some device in such a manner that the error signal is brought back towards zero. Such systems have diverse application and could, for example, be applied to altimeter devices wherein an aneroid capsule is connected in a suitable manner to a servo system which is, in turn, connected to an altimeter pointer. The altimeter pointer is positioned by a servo motor within the servo system in response to the expansion and contraction of the aneroid capsule.

In such an application, a failure of the servo system would cause a dangerous condition to exist in that the pilot would be unaware of a system failure and thus an incorrect altimeter reading. Clearly, the failure of any general servo system could cause similar danger or inconvenience.

The principle of the present invention is to provide a novel circuit means for continuously monitoring the performance of the servo device by monitoring the output error signal within the servo system. Thus, in accordance with the invention, when an error signal exists which exceeds the highest error signal level which is to be expected during the operation of the system, the monitor will automatically deactivate the servo device and actuate a suitable warning means such as a warning flag or audible alarm, or the like.

In addition, and further in accordance with the invention, the novel monitoring circuit will, after a predetermined time after deactivation of the system, periodically reactivate the system, and, if the fault has cleared itself, the system will remain in operation with the servo system returned to its normal function. In the event that the fault has not cleared itself, it will be once again deactivated, this process continuing until the system is completely removed from service either manually or through some suitable time delay means.

Where the system is used for aircraft instruments, the recycling occurs within a relatively short time so that a malfunction in the servo system will cause a repeated actuation of a warning flag or alarm, thereby calling the pilot's attention to the condition so that he can take positive steps in the correction or de-energization of the faulty system.

Further in accordance with the invention, the initiation of the malfunction indication is intentionally delayed for some predetermined time so that the output error signal being monitored must remain beyond some predetermined value for longer than some particular time, such as three seconds in the case of use of the system with altimeters. This would prevent operation of the monitoring system by spurious signals or transient malfunctions.

Accordingly, a primary object of this invention is to provide a novel monitor device for monitoring the performance of a servo system.

Yet another object of this invention is to provide a novel monitoring circuit for servo devices which can be directly connected to existing devices.

Another object of this invention is to provide a novel fault monitor for servo systems which will actuate a warning device in response to the generation of error signals within the servo device which exceed some predetermined condition.

A further object of this invention is to provide a novel automatic resynchronization monitor circuit for servo devices which, responsive to a fault within the servo device, will repeatedly remove the device from service and return the device to service with the device remaining in service if the fault has cleared itself.

These and other objects of this invention will become apparent from the following description of the drawing which shows, in a partially schematic fashion, the circuit of the present invention.

Referring now to the drawing, I have illustrated therein a standard type of servo system for use particularly with altimeters. Thus, an aneroid capsule 10 is provided for monitoring external pressure which is related to altitude, with the capsule 10 mechanically connected to the input of a suitable servo 11 which may be of any desired type.

The altimeter indicator 12 then has a pointer 13 which is rotatable on a shaft schematically shown by dotted line 14. The pointer 13, as indicated by the dotted line 15, serves as a second mechanical input to the servo which generates an error signal in output conductors 16 and 17 in the event that the position of pointer 13 must be changed due to a change in the condition of capsule 10.

Thus, in a standard manner, the error signal of conductors 16 and 17 is connected to the input of a suitable amplifier 18 which, in turn, has output terminals connected to the servo motor 19. The servo motor 19 is then mechanically connected to shaft 14 of pointer 13 and, responsive to the error signals from the output of servo 11, will rotate the shaft 13 in an attempt to bring this error signal back to zero, thereby positioning pointer 13 at the proper indicating value. A common A-C power supply 19a may then be used for the input A-C terminals of servo 11, amplifier 18 and motor 19.

In accordance with the invention, a monitoring system is provided for monitoring the level of the error signal in conductors 16 and 17 whereby, if the servo system malfunctions, the error signal would reflect this malfunction by rising above some predetermined value without being returned to zero value through the proper function of the servo system. If desired, the monitoring means can include an amplifier if the error signal level is too low to actuate the monitoring system directly.

Thus, in accordance with the invention, a monitoring amplifier 20 is connected to conductors 16 and 17 through the contact 22 which is associated with relay coil 22a. It will be noted that all relay contacts (which could be replaced with suitable solid state switching devices without departing from the invention) are shown in the position which they assume normal during operation of the servo system.

Note that contact 21, when moved to the right, will short-circuit the input to the monitor amplifier 20, with the system in the fault-sensing mode of operation.

It will be further noted that the A-C power for the monitor amplifier 20 can be derived from the A-C power supply 19a.

The monitoring amplifier 20 has an output circuit which may be D-C, if desired, which is connected in series with relay coil 21, current limiting resistor 22, and normally closed contact 23 associated with relay coil 23a.

The normally closed contacts 21a and 21b are associated with relay coil 21 and remain closed so long as the output of monitor amplifier 20 to the relay coil 21 is below some predetermined level. However, once this current exceeds the predetermined level, contacts 21a and 21b are opened.

A D-C power supply 30 is then provided with the lead from one terminal thereof containing a normally closed relay contact 31 which is associated with an energizing coil 31a which is normally de-energized and can be energized by the pilot to completely remove the system from operation.

A second relay switching means is then provided which includes solenoid 32 which has associated therewith normally closed contact 32a and contact 32b which is a two-position contact normally held in the lower position shown in the drawing.

It will be noted that both relay coils 21 and 32 are provided with a resistance-capacitance shunt including capacitors 33 and 34, respectively, and resistors 35 and 39, respectively. This shunting circuit provides a time delay for the de-energization of their respective coils, as will be described more fully hereinafter.

Relay coil 32 is then connected to the positive terminal of power supply 30 through a diode 36 to a solenoid 37 and back to the negative side of the D-C power supply 30 through the contact 32b. The solenoid 37 is operatively connected to a warning flag 38 which may be of any desired type, and is brought from a first and non-indicating position to an erect and danger-indicating position responsive to the de-energization of solenoid 37. That is to say, the flag 38 is in a non-indicating position only when the coil 37 is energized, thereby introducing a fail-safe feature into the monitoring system. Note that flag 38 could be replaced by any suitable warning system such as a buzzer or a light, or the like.

The previously described relay coil 23a is also connected in series with the D-C power supply 30, and is shunted by a suitable diode 40. A fourth relay is then provided which includes the solenoid coil 22a which is shunted by diode 41.

The operation of the system is as follows, assuming that the servo has been performing within the monitoring error limits and, for some reason, the error signal now exceeds the normal limits:

Under this condition, the output of monitor amplifier 20 exceeds its normal operation output level and exceeds the trip level of solenoid coil 21. The contacts 21a and 21b of solenoid contact 21 will not trip immediately, but will be delayed by a time determined by the resistance of coil 21 and resistor 35 in the capacitance of capacitor 33. In the particular example of the invention, this time delay is made to be three seconds. If, during this three seconds, the error signal connected to amplifier 20 returns to its normal level, the amplifier output drops, and nothing further will happen within the system. If, however, the error signal remains beyond its normal limit for this three-second duration, contacts 21a and 21b open, thereby removing power from the solenoid coil 37 to permit the erection of the warning flag 38. That is to say, the circuit to solenoid 37 from the D-C power supply, which includes the positive terminal of D-C power supply 30, relay coil 31, conductor 50, conductor 51, relay contact 32b, solenoid coil 37, contact 21a and back to the negative terminal of D-C power supply 30, is opened by the opening of contact 21a. Thus, after the three-second time delay, the warning flag 38 is erected.

At the same time, power is removed from the servo motor 19 through the opening of contact 21b, thereby deactivating the servo system. Power is also removed from relay coil 32, again due to the opening of contact 21a.

Contacts 32a and 32b of relay coil 32, however, do not open immediately, but are delayed by an amount of time determined by resistor 35 and capacitor 34 which may again be three seconds, at the end of which contacts 32a and 32b change position. The operation of contact 32b to its upper position then applies power to the normally de-energized coil 22a, thereby causing the opening of contact 22 and the short-circuiting of monitor amplifier 20. This, in turn, reduces the output error signal of monitor amplifier 20 to below the trip level of coil 21 and restores contacts 21a and 21b to their closed position. In turn, relay coil 32 is energized to return contacts 32a and 32b to the position shown in the drawing, and restoring power to the warning flag solenoid 37. In addition, power is restored to the servo motor 19, reactivating the servo, and power is removed from relay coil 22a, allowing the reclosing of contact 22, allowing the monitor amplifier 20 to again monitor the servo performance.

If the servo error has been cleared during this time sequence, then the servo will continue to perform normally. However, if the servo fault has not cleared itself, then the switching sequence reoccurs to raise the warning flag 38 for the length of time required for the cycle of operation, whereupon the flag is again returned to the non-indicating position, and monitoring is again resumed. This sequence will continue to cycle until the error in the system has cleared, or until power is removed from the system as by manual energization of coil 31a and disconnection of the A-C power supply 19a by the operator.

Note that when the servo has been repaired to remove the fault which exists and power is reapplied, the switching signal will occur once before synchronization (normal servo performance) is established.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A servo monitoring system comprising a servo system having an output error signal, monitoring means having input terminals and output terminals, first and second relay switching means having respective open circuit positions and closed circuit positions and input connection circuits, and indicator means operable from a first position to an indication position responsive to error signals having at least a predetermined magnitude for at least predetermined length of time; said input terminals of said monitoring means connected to said output error signal; said output terminals of said monitoring means connected to said input connection circuit of said first relay switching means; said relay switching means operable from its said open circuit position to its said closed circuit position responsive to an output from said monitoring means which exceeds a predetermined value; said first relay switching means connected to said input connection circuit of said second relay switching means; said second relay switching means operating from said open circuit position and to said closed circuit position responsive to operation of said first relay switching means to its said open circuit position; said first relay switching means connected in series with said indicator means and moving said indicator means from said first position to said indicator position responsive to operation of said first relay to said open circuit position; said second relay means connected to said input terminals of said monitoring means and short circuiting said input terminals responsive to operation of said first relay switching means.

2. The device as set forth in claim 1 which includes time delay circuit means for delaying the operation of said first relay switching means for a predetermined time.

3. The device as set forth in claim 1 wherein said servo system includes a servo motor having input terminals; said first relay switching means connected to said servo motor input terminals and removing power from said terminals responsive to operation of said first relay switching means to said open circuit position.

4. A servo monitoring system comprising amplifier means having input terminal means connectable to the output error signal of a servo system, a first and second switching means operable from respective first circuit positions to second circuit positions, a first and second operating circuit for operating said first and second switching means respectively, and indicator means for indicating a malfunction in said servo system; said amplifier means having an output connected to said first operating circuit; said first operating circuit operating said first switching means to its first circuit position when said output of said amplifier is above a predetermined value and to said second circuit position when said output of said amplifier is below a predetermined value; said first switching means connected to said indicator means and said second operating circuit; said second operating circuit moving said second switching means to its said first or second circuit position when said first switching means is in its first or second circuit position respectively; said first switching means connected to said indicator means and moving said indicator means between a first or second position when said first switching means is in its said first or second circuit position respectively; said second switching means connected to said input terminal means of said amplifier means and removing and disconnecting said error signal from said input terminals when said second switching means is in its said second position.

5. The device as set forth in claim 4 which includes time delay means connected to said first operating circuit for delaying the operation of said first switching means for a predetermined length of time.

References Cited

UNITED STATES PATENTS

| | | | |
|---|---|---|---|
| 2,662,207 | 12/1953 | Hollister | 318—489 |
| 2,665,086 | 1/1954 | Moog et al. | 318—489 XR |
| 2,987,274 | 6/1961 | McWilliams et al. | 318—489 XR |

BENJAMIN DOBECK, *Primary Examiner.*

UNITED STATES PATENT OFFICE
CERTIFICATE OF CORRECTION

Patent No. 3,412,280                                                        November 19, 1968

Robert S. De Grande

It is certified that error appears in the above identified patent and that said Letters Patent are hereby corrected as shown below:

Column 4, line 49, after "said" insert -- first --; line 50, "open" should read -- closed --; line 51, "closed" should read -- open --.

Signed and sealed this 31st day of March 1970.

(SEAL)
Attest:

Edward M. Fletcher, Jr.                                      WILLIAM E. SCHUYLER, JR.
Attesting Officer                                                         Commissioner of Patents